Jan. 6, 1953

W. G. RANEY 2,624,175

FLUID COUPLING WITH RELATIVELY
AXIALLY MOVABLE VANE MEMBERS

Filed Sept. 8, 1951

INVENTOR.
WILLIAM G. RANEY
BY
Oberlin & Limbach
ATTORNEYS.

Patented Jan. 6, 1953

2,624,175

UNITED STATES PATENT OFFICE 2,624,175

FLUID COUPLING WITH RELATIVELY AXIALLY MOVABLE VANE MEMBERS

William G. Raney, Shaker Heights, Ohio

Application September 8, 1951, Serial No. 245,747

2 Claims. (Cl. 60—54)

The present invention relates generally as indicated to a fluid coupling, and more particularly to a fluid coupling or liquid flywheel which is adapted for automotive or like use to transmit power from the engine crankshaft to the propeller shaft.

Hitherto, in one known type of fluid coupling, torque is transmitted from a driver (a rotary casing equipped with vanes and driven by the crankshaft) to a runner (a vaned member journalled in said casing) through the medium of a fluid contained in said casing, said runner being operatively connected to a suitable gear transmission mechanism to achieve the necessary torque multiplications for rapid acceleration, hill climbing, etc. In such known type of fluid coupling the opposed edges of the driver and runner vanes are spaced apart a fraction of an inch such as ¼″, for example, whereby the engine may be speeded up quickly to about 850 R. P. M., at which speed the coupling delivers the full torque of the engine. In such fluid coupling, the driver rotates at crankshaft speed which is always somewhat faster than the runner speed owing to slip, this resulting in a cushioning action for smooth transmission of power. One criticism of this type of fluid coupling is that the vehicle tends to "creep" unless the brakes are applied or unless the friction clutch generally employed therewith is disengaged, such creeping being especially noticeable when the idling speed of the engine is somewhat greater than normal. Another criticism of this type of fluid coupling is that torque multiplication is achieved by employing a gear transmission mechanism which not only complicates the power transmission assembly but also adds considerably to the cost and weight thereof.

There are, of course, other types of hydraulic drives as for example one in which the hydraulic system includes a pump wheel, a rotor wheel, and a casing with stationary blades, such system being further complicated in the requirement of a fluid supply tank, a filter, an injector or booster operated by means of the circulation of the fluid which is by-passed from a region of high pressure to a region of low pressure, an aspirator through which the fluid flows to the supply tank, a sump tank from which fluid is sucked by the aspirator, and a fluid cooler.

Still another well known type of fluid transmission combines a four-speed geared transmission with a liquid flywheel or fluid coupling, the latter being operative to cushion the impact of the gears as they shift automatically and to dampen the torque reaction of the engine. In this type of automatic fluid transmission, oil is supplied to the liquid flywheel from the gear transmission at a pressure of about 30 p. s. i.

Accordingly, it is one principal object of the present invention to provide a low cost fluid coupling which is of simple, light weight construction and which does not require that a multispeed gear transmission mechanism be associated therewith.

Another object of this invention is to provide a fluid coupling which effects a torque multiplication within itself, thereby eliminating the necessity for the usual multi-speed gear transmission.

Another object of this invention is to provide a fluid coupling which eliminates the problem of "creep" even when the engine is idling at a speed greater than normal.

Other objects and advantages will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
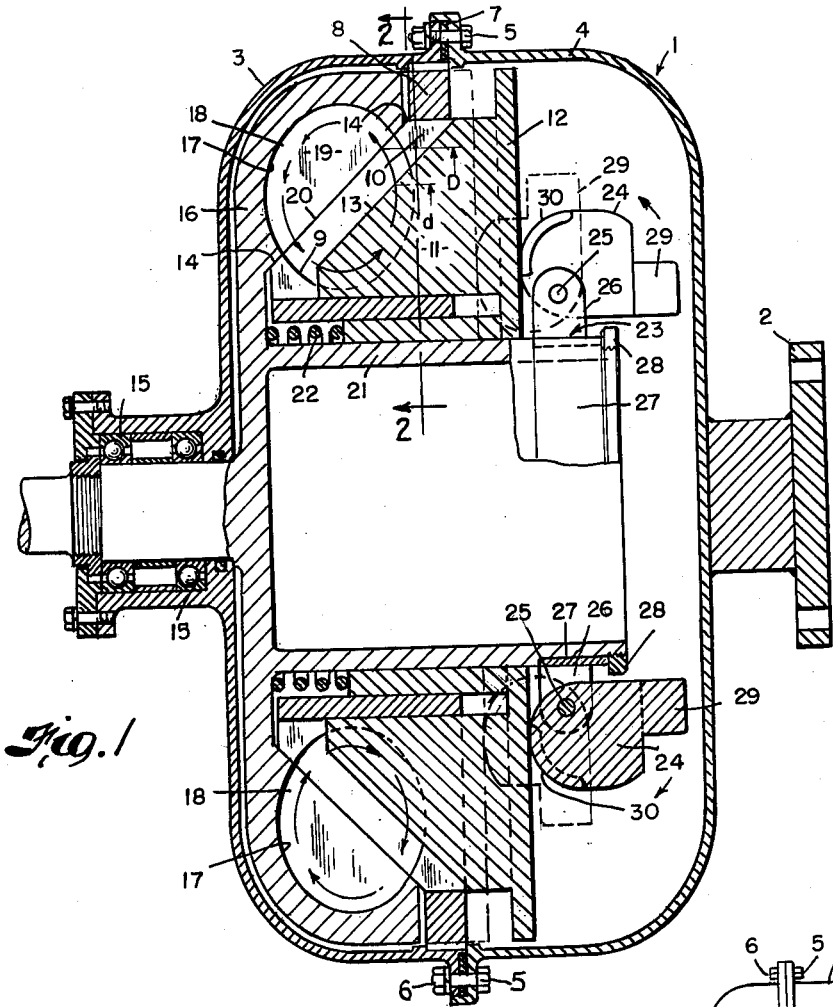
Fig. 1 is a cross-section view diametrically across one embodiment of the present invention.
Figure 2:
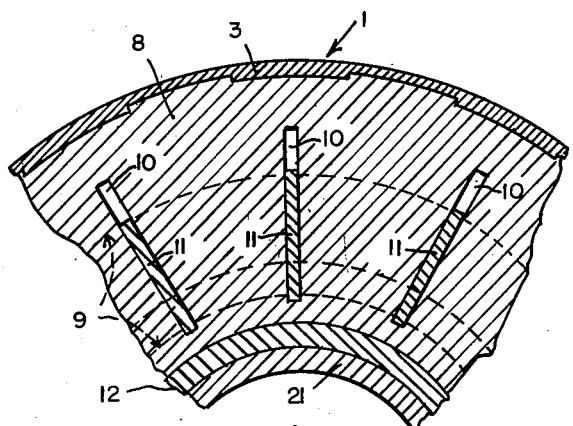
Fig. 2 is a transverse cross-section view taken substantially along the line 2—2, Fig. 1.

Referring now more particularly to the drawing and especially to Figs. 1 and 2 thereof, the fluid coupling comprises a rotary hollow casing 1 adapted to be partly filled with oil or other suitable liquid and secured to a power source, such as an automobile engine, by means of the mounting flange 2. Said casing 1 is preferably made in two parts 3 and 4 formed as by drawing for example and detachably secured together as by means of nuts 5 and bolts 6 around the periphery with a suitable gasket 7 clamped between said casing parts, the casing part 3 being internally splined or otherwise formed so as to nonrotatably receive the correspondingly splined or otherwise formed driving member 8. Said driving member 8 may be retained in axially fixed position within said casing 1 as by means of opposed shoulders of said casing parts 3 and 4 overlying the opposite marginal edge portions of said driving member 8.

Said driving member 8 is formed with an annular recess 9 on one side thereof and with a plurality of radially or otherwise disposed slots 10 to slidably receive the axially extending vanes 11 of a vane member 12, said vanes 11 extending part way into the annular recess 9 in one position of said vane member and all the way into such recess with the leading edges 13 of the vanes flush with the edges 14 of the recess 9.

The hollow casing 1 together with the driving member 8 and vane member 12 constitute what may be termed the driver of the fluid coupling combination.

Journalled in said casing 1 as by means of suitable anti-friction bearings 15 is a runner or driven member 16 which is axially opposed to the driving member 8 and formed with an annular recess 17 complementary with the recess 9, such recess 17 being generally radially sub-divided to define a series of circularly arranged pockets 18 as by means of vanes or partitions 19 radially traversing such recess.

For a reason which will be presently explained in further detail, the edge portions 13 and 14 and 20 of the recesses 9 and 17 and vanes 11 and 19 are disposed at different diameters such as for example in conical or other planes so as to effect torque multiplication when said opposed vanes are spaced apart as shown in full lines in Fig. 1.

Said driven member or runner 16 is provided with a central tubular projection or boss 21 on which said vane member 12 is axially slidable. A compression spring 22 is interposed between said runner 16 and said vane member 12 to resiliently urge the latter toward the right axially away from said runner 16.

Carried on the end of said extension or boss 21 is a vane member actuating unit 23 comprising at least one, but preferably three or more, counterweighted levers or like centrifugally movable members 24 pivotally connected as by means of pins 25 to pairs of ears 26 projecting radially from uniformly spaced points about a ring member 27. Said ring member 27 is detachably mounted on the end of said tubular extension 21 as by means of a nut 28 threaded onto the end of said extension and clamping said ring member 27 against a shoulder on said extension. Obviously, any other well known means may be employed for securing said ring member 27 on said extension 21. The weighted ends of said levers 24 are denoted by the numeral 29. Said levers 24 are provided with cams 30 which engage the adjacent face of vane member 12, said cams being so formed that, when levers 24 swing by centrifugal force in the directions indicated by the arrows toward the dotted line positions owing to rotation of runner 16, said vane member 12 is progressively urged toward the left closer to the sub-divided annular recess 17 or pockets 18 of said runner.

As evident, the present fluid coupling as illustrated is to be regarded as merely typical since many minor changes may be made without departing from the spirit of the invention.

Figure 3:
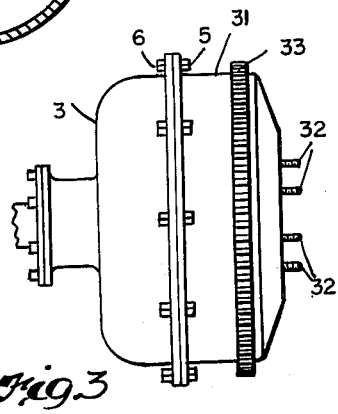
Fig. 3 is an elevation view of a modified form of the invention in which the casing of the fluid coupling constitutes the engine flywheel.

The form of fluid coupling illustrated in Fig. 3 may be of the same internal construction as the coupling of Figs. 1 and 2 but instead of providing a flange 2 for connection with a power source, the casing part 31 is in the form of a flywheel adapted to be attached directly to the engine crankshaft by studs 32 and has a ring gear 33 thereon for engagement by a starter gear (not shown).

With respect to the operation of the present fluid coupling in an automobile wherein the casing 1 is secured to the engine crankshaft and the runner 16 is secured to the propeller shaft, let us first assume that said runner 16 is not rotating and that said driver (casing 1 and members 8 and 12) is rotating at the idling or somewhat greater speed of the engine. In such case, since said runner 16 is not rotating, the counterweighted levers 24 will be held in the full line positions of Fig. 1 by pressure exerted on cams 30 by vane member 12 through compression spring 22. With said vane member 12 thus positioned in spaced relation to runner 16 with vane edges 13 inset from edges 14 of recess 9, the low speed rotation of said driver does not transmit sufficient torque to runner 16 to cause creeping even though the idling speed of the engine be somewhat greater than normal.

Now, should the engine be speeded up and said driver rotated correspondingly faster, the driver vanes 11 will throw the fluid around and outward in casing 1 until the fluid crosses the gap between the driver and runner vanes 11 and 19 whereby the fluid impinges on said runner vanes 19 to cause rotation of said runner 16. The fluid spirals in the pockets or sub-divided complementary recesses of said driver and runner as shown by the arrows and because the fluid is flowing, as shown, in a generally radially outward direction across the vane gap from the driver to the runner, the energy of the spiralling fluid is applied to the runner at a larger diameter "D" than the diameter "d" of the driver which has placed energy in the fluid, this being due to the angular disposition of the opposed edges of the driver and runner vanes and the spaced relation thereof as shown. This action has been found to effect a torque multiplication in the ratio of D/d less losses in much the same manner that a driving gear in mesh with a larger driven gear effects a torque multiplication. This provides for a reasonably rapid acceleration of the automobile from a standstill or for increased power as required when driving the automobile in sand or out of a ditch, and in similar circumstances, without the usual change-speed gear transmission.

Finally, as the runner 16 progressively picks up speed, the rotation of the centrifugally actuated unit 23 effects a progressive axial movement of the driver vane member 12 toward the runner vanes 19 to reduce the gap between "d" and "D" and thus to approach a 1:1 speed ratio between the driver and the runner or what, in effect, is a direct drive except for negligible slip which might occur when the edges 13 and 20 of the vanes 11 and 19 are in close proximity to each other or substantially in contact. Likewise, as the runner speed decreases, the spring 22 progressively forces the driver vane member 12 toward the right away from the runner vanes 19 and at the same time, through the cams 30, causes the counterweighted levers 24 to progressively swing back from the dotted line positions toward the solid line positions to thus again create a radial gap between the vanes to achieve a torque multiplication in accordance with the power requirements. It will be apparent to those skilled in the art that the characteristics of the spring 22 and the disposition of the levers 24 may be changed by providing adjusting means or by replacement to change the operating characteristics of the fluid coupling so as to vary the runner speed at which the vane member 12 commences to move toward the runner 16 and also to vary the runner speed change between the maximum and minimum vane gap. Likewise, it may be desirable to provide means for adjusting the maximum gap between the runner vanes 19 and the driver vanes 11.

Having thus described one form of the present invention it can be seen that the same greatly simplifies the power transmission assembly in that the usual change-speed gear transmission may be dispensed with except for a reverse gear mechanism. It is to be understood that centrifugal means other than unit 23 for actuating the driver vane member 8 responsive to the speed of rotation of the runner or driven member 16 may be employed. Likewise, the spring return means 22 may be mounted elsewhere than shown, or be of other than coil spring form, as for example, suitable spring means may be disposed to act on the centrifugally movable members directly where the latter are connected to the driver vane member 12.

While, in the illustrated embodiment of the invention, the centrifugally actuated device 23 is associated with the runner or driven member 16, it will be apparent that said device 23 may be arranged in association with the driver 12 so that the latter is shifted relative to said runner by its own speed of rotation. Moreover, insofar as the broader aspects of the invention are concerned relative shifting of the driver and runner may be effected hydraulically or mechanically or other well known expedient from the exterior of casing 1 rather than automatically as herein. Also, the conical disposition of the vane edges is to be regarded as merely exemplary since the feature of torque multiplication may be obtained even though the vane edges are disposed otherwise as for example in radial planes, the principal requirement being that the energy of the fluid from the driver be placed into the runner at a larger diameter or in other words that the fluid travels in a radial direction through the space between the vane edges.

Other modes of applying the principle of the invention may be employed, change being made as regards the details described, provided the features stated in any of the following claims, or the equivalent of such, be employed.

I therefore particularly point out and distinctly claim as my invention:

1. A fluid coupling comprising a hollow casing adapted to contain a body of fluid, axially opposed driving and driven members mounted for relative rotation and relative axial movement and formed with opposed annular recesses sub-divided by generally radially extending vanes into circumferentially arranged complementary pockets whereby torque is transmitted from said driving member to said driven member through such body of fluid, the opposed marginal edges of such vanes lying in generally conical planes whereby, when said members are spaced apart axially, the energy of the fluid is transmitted from a smaller diameter of said driving member to a larger diameter of said driven member to achieve a torque multiplication.

2. A fluid coupling comprising a hollow generally cylindrical casing adapted to contain a body of fluid, a driving member diametrically across an intermediate portion of said casing, said driving member comprising a generally radially slotted plate non-rotatably and axially fixedly mounted in said casing and formed with an annular recess around one side thereof, and a vane member axially slidable with respect to said plate and having vanes extending through the slots of said plate into such recess, a driven member journalled in said casing axially opposed to said plate, said driven member being formed with an annular recess generally radially sub-divided by vanes and axially opposed and complementary with the recess and vanes of said driving member whereby upon rotation of said casing and said driving member torque is transmitted through such fluid and the opposed sub-divided recesses to said driven member, and means responsive to rotation of said driven member by said driving member and operatively connected to said vane member to axially move the latter toward said driven member and thereby reduce the slip between said driving and driven members, the opposed marginal edges of the vanes of said driving and driven members lying in generally conical planes whereby, when said members are spaced apart axially, the energy of the fluid is transmitted from a smaller diameter of said driving member to a larger diameter of said driven member to achieve a torque multiplication.

WILLIAM G. RANEY.

REFERENCES CITED

The following references are of record in the file of this patent:

UNITED STATES PATENTS

| Number | Name | Date |
|---|---|---|
| 2,318,187 | Addison | May 4, 1943 |
| 2,391,413 | Gregg | Dec. 25, 1945 |
| 2,544,713 | Miller | Mar. 13, 1951 |

FOREIGN PATENTS

| Number | Country | Date |
|---|---|---|
| 438,616 | Great Britain | Nov. 20, 1935 |
| 452,990 | Great Britain | Sept. 3, 1936 |
| 589,264 | Germany | Dec. 5, 1933 |